United States Patent
van Heijkant et al.

(10) Patent No.: US 6,277,946 B1
(45) Date of Patent: Aug. 21, 2001

(54) METHOD FOR PREPARATION OF POLYCARBONATES

(75) Inventors: Johannes Jacobus van Heijkant, Murcia (ES); Christopher Poirier, Evansville, IN (US); Tomoaki Shimoda, Ichihara; Akio Kanezawa, Sodegaura, both of (JP); Carlos Godinez Seoane, Cartagena (ES)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/567,826

(22) Filed: May 9, 2000

(30) Foreign Application Priority Data

Feb. 18, 2000 (ES) ................................ 200000385

(51) Int. Cl.$^7$ .................................................. C08G 64/00
(52) U.S. Cl. .......................................... 528/196; 528/198
(58) Field of Search ............................................. 528/196

(56) References Cited

U.S. PATENT DOCUMENTS

| | | | |
|---|---|---|---|
| 5,276,109 | 1/1994 | Sakashita et al. | 525/461 |
| 5,364,926 | 11/1994 | Sakasahita et al. | 528/198 |
| 5,418,269 | 5/1995 | Ishiwa et al. | 524/315 |
| 5,606,007 | 2/1997 | Sakashita et al. | 528/176 |

*Primary Examiner*—Terressa M. Boykin

(57) ABSTRACT

A method is provided for the preparation of polycarbonates by the reaction of a diaryl carbonate, such as DPC and a dihydric phenol, such as BPA. The method utilizes the steps of successively processing the diaryl carbonate and the dihydric phenol in a melt in a first reaction stage, a second reaction stage and at least a first polymerization stage, and shifts the processing conditions such that the desired low viscosity/high end-cap product is obtained. This is achieved by having the ratio of diaryl carbonate to dihydric phenol in the melt prior to the first reaction stage greater than 1.08; and by controlling the temperature and residence time in the first polymerization stage to provide a polycarbonate product having a melt flow rate at 250° C. of greater than 10 g/min and an end-cap level of at least 90%. The method of the invention can be used in a linear manufacturing process, in which there is one product produced. The method of the invention can also be incorporated into a multi-line manufacturing process for the simultaneous production of more than one product. Thus, a stream of product produced from the first polymerization stage may be split into two or more lines which are further processed to produce, for example, a low viscosity, high end-cap product and a medium viscosity, moderate end-cap product.

15 Claims, 1 Drawing Sheet

METHOD FOR PREPARATION OF POLYCARBONATES

FIELD OF THE INVENTION

The present application is a U.S. non-provisional application based upon and claiming priority from Spanish Application No. 200000385, which is hereby incorporated by reference.

This application relates to methods for the manufacture of polycarbonates using a melt condensation reaction, and in particular to methods which provide for the efficient manufacture of polycarbonates having high end-cap levels.

BACKGROUND OF THE INVENTION

In the process of making polycarbonate, reactions which lead to a phenyl end group result in a decrease in reaction rate and chain growth. If such phenyl capping reactions happen with high frequency, the average length of polymer molecules in a composition will be short compared to a composition where capping reactions happened with lower frequency.

Because of this, the properties of a polymeric material are related to the proportion of polymers which have been terminated. The "end-cap level" is a quantitative measure of this proportion, expressed as a percentage. The end-cap level is arrived at by determining the number of chains which are terminated with a reactive hydroxyl group (uncapped) and then taking the remainder of the chain ends as being capped. Such a determination can be made using spectroscopic measurements. The level of endcapping (E/C%) is then given by the formula:

E/C%=(capped chain ends/total chain ends)×100

One method for manufacture of polycarbonates is based upon the melt polycondensation of aromatic dihydroxy compounds such as bisphenol A (4,4'-dihydroxydiphenyl-2, 2-propane, BPA) with carbonic acid diesters such as diphenylcarbonate (DPC) in the presence of an alkaline catalyst. In conventional processes of this type, the reactants are sequentially subjected to conditions which form a melted mixture or reactants, form low molecular weight prepolymers, and form the final product from the low molecular weight prepolymers. This stepwise approach to processing facilitates the production of a consistent product with well defined characteristics. Thus, polycarbonates may be prepared in a multistage reactor system such as that shown in FIG. 1, where the reactants BPA and DPC are first combined with a catalyst such as tetraalkylammonium hydroxide and a basic alkali metal catalyst in a mixing stage (MD). In the mixing stage, the reactants and catalyst are mixed together and heated to form a melt. This melt is then transported into a first reactor (1R), where the transesterification reaction of BPA and DPC begins to start the formation of prepolymers. The product produced in this first reactor is principally small condensation products (oligomers) and unreacted starting materials. In the second reactor (2R), the size of the oligomers formed is larger, as a result of continued reaction of the initially formed oligomers. After the second reactor, the melt is transported to a first polymerizer (1P), such as a double screw stirring polymerizer. In this polymerizer, the prepolymers are processed at a first polymerization temperature, for example 290° C. for a period of time such as 5 minutes. This processing results in the formation of a polycarbonate product which contains residual catalyst. Because this catalyst can compromise the properties of the final product if allowed to remain, a quencher is added which neutralizes the catalyst, and the quenched product is fed to a second polymerizer in which final processing occurs by evaporation of unreacted residual monomers to produce a low viscosity (e.g., IV≈0.35 g/dl; Mn≈8500 g/mol) polycarbonate product.

To increase the flexibility of a polycarbonate manufacturing facility such that either low or medium viscosity (IV≈0.42 g/dl; Mn≈10,800 g/mol) products can be produced, a processing scheme which utilizes two alternative second polymerizers as shown in FIG. 2 can be used. In this case, the product stream from second polymerizer 2aP is substantially the same as the product stream from the series of steps shown in FIG. 1. The product stream fed to the other second polymerizer 2bP is not quenched, however, such that the processing in the polymerizer results in a further increase in the size of the products and a medium viscosity product.

The products produced in each of these reactions generally have end-cap levels of about 75–85%. Such levels are suitable for many applications. However, certain applications, such as the manufacture of optical disks, require low viscosity polycarbonates with higher and consistent end-cap level greater than 90% in order to achieve desired characteristics including antistatic properties. To date, there is no efficient method for manufacturing polycarbonates while providing consistent and controlled high end-cap levels.

It is a goal of the present invention to provide a method for manufacturing low viscosity-high end-cap level polycarbonates via a melt condensation procedure.

It is a further goal of the present invention to provide a branched processing procedure in which either low viscosity-high end-cap level polycarbonates or medium viscosity, normal end-cap products are made via a melt condensation procedure.

SUMMARY OF THE INVENTION

The present invention provides a method for the preparation of polycarbonates by the reaction of a diaryl carbonate, such as DPC and a dihydric phenol, such as BPA. The method utilizes the steps of successively processing the diaryl carbonate and the dihydric phenol in a melt in a first reaction stage, a second reaction stage and at least a first polymerization stage, and shifts the processing conditions such that the desired low viscosity/high end-cap product is obtained. This is achieved by having the ratio of diaryl carbonate to dihydric phenol in the melt prior to the first reaction stage greater than 1.08; and by controlling the temperature and residence time in the first polymerization stage to provide a polycarbonate product having a melt flow rate at 250° C. of greater than 10 g/min and an end-cap level of at least 90%. In one embodiment of the invention, a melt with an initial DPC/BPA ratio of 1.137 is processed through a first polymerization stage in which the temperature is maintained at a temperature of 307–309° C. for a period of 8.3–9.4 minutes.

The method of the invention can be used in a linear manufacturing process, in which there is one product produced. The method of the invention can also be incorporated into a multi-line manufacturing process for the simultaneous production of more than one product. Thus, a stream of product produced from the first polymerization stage may be split into two or more lines which are further processed to produce, for example, a low viscosity, high end-cap product and a medium viscosity, moderate end-cap product.

DETAILED DESCRIPTION OF THE INVENTION

Figure 1:
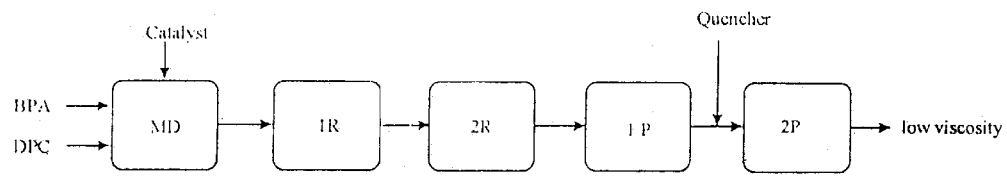
FIG. 1 shows a linear processing scheme for manufacture of polycarbonates.

In the method of the present invention a polycarbonate having desirable properties of low viscosity and high end-cap levels is manufactured by adjustment of the starting ratio of diaryl carbonate to dihydric phenol and by controlling the processing conditions, specifically the temperature and residence time, in the first polymerization stage. The polycarbonate produced in this first polymerizer may be finished to result in a low viscosity, high end-cap product, or it may be further processed to provide a medium viscosity, moderate end-cap product.

As used in the specification and claims of this application, the term "low viscosity" refers to compositions with a melt flow rate (MFR) at 250° C. of greater than 10 g/min; the term "medium viscosity" refers to compositions with a melt flow rate (MFR) at 300° C. in the range of 10 to 30 g/min; the term "high viscosity" refers to compositions with a melt flow rate (MFR) at 300° C. of less than 10 g/min the term "high end-cap" refers to end-cap levels of 90% or great; and the term "medium end-cap" refers to end-cap levels of 80–90%; and the term "low end-cap" refers to end-cap levels less than 80%.

In the following discussions of specific embodiments of the invention, DPC and BPA will be used as exemplary reactants. This usage is for convenience only and reflects the fact that DPC and BPA are the most common reactants used in production of polycarbonates. It is not intended to limit the invention to these starting materials.

The method of the invention relies upon the careful balancing of three process conditions: the DPC/BPA ratio; the processing temperature in the first polymerization stage and the residence time in the first polymerization stage. The combination of the conditions for practicing the invention work in harmony to produce the desired result, although individually the conditions do not lead to the desired product. Thus, the first process condition, the DPC/BPA ratio, is controlled so that DPC is present in excess, a condition which favors the production of low viscosity, high end-cap product. The second process condition, the temperature in the first polymerizer, is actually set to a higher level than is conventional in the manufacture of polycarbonates. This increase in temperature, considered as a single parameter, acts counter to the desired result of producing low viscosity/high end/cap product because it increases the likelihood of polymerization occurring in the reactor. The third process condition, the residence time in first polymerization stage, is longer than conventional residence times. This parameter would favor longer polymers, with higher viscosity, because there is more time to react. Thus, taken alone this change is also counter to the desired result. As demonstrated in the examples set forth below, however, the balancing of these conditions allows the efficient production of low viscosity, high end-cap polycarbonate.

A first embodiment of the invention is a linear manufacturing method for the production of low viscosity, high end-cap polycarbonate. This method will be described with reference to the schematic representation of the manufacturing plant shown in FIG. 1. In the first, or mixing stage of the process, DPC and BPA are combined with catalyst in a mixer (MD) and heated to form a melt. Suitable catalysts include but are not limited to NaOH, $NaH_2PO_3$ and other known alkaline phosphorus catalysts. NaOH can be used in many applications. $NaH_2PO_3$ is suitably employed when it desirable to minimize the amount of Fries product produced in the reaction.

DPC and BPA are introduced into the mixer MD at a molar ratio of at least 1.08. If the ratio is lower than this (i.e., closer to the conventional ratio of 1:1), the increase in the degree of endcapping is not sufficient to produce the desired low viscosity, high end-cap product. On the other hand, the upper limit is less critical and is determined by practical considerations which may vary from one manufacturing facility to another. For example, if the ratio is too high, the product may be of such low viscosity that it is not useful and this effect may not be able to be off-set by the process changes applied during the polymerization stage. In most cases, the desired DPC/BPA ratio will fall in the range between 1.08 and 1.2.

After the mixing stage, the melt is transferred to a first reactor 1R for the production of small oligomers. This reactor is suitably a continuous stirred tank type reactor. Consistent with conventional practice, the conditions in this reactor are:

temperature: 230 to 260° C.

pressure/vacuum: 100–250 mbar residence time: 45 to 90 minutes

The melt is then transported to a second reactor 2R, in which the building of oligomers continues. The conditions in this reactor are:

temperature: 250 to 280° C.

pressure/vacuum: 15–50 mbar residence time: 20 to 60 minutes.

These conditions are suitable for use in a manufacturing employing two reactors (i.e, 1R and 2R). Process conditions in 1R are limited by three phenomena: 1) polycarbonate crystallization at lower temperatures; 2) imbalance of DPC/BPA ratio due to a high DPC evaporation rates; and 3) foaming and entrainment of low viscosity oligomers due to excessive phenol vaporization. Temperature, vacuum and residence time in 1R and 2R are set at levels which permit an adequate optimization of these phenomena for a given vessel size. However, it will be appreciated that with a different vessel design and sizing, the desired level of initial polymerization could be accomplished in one single reactor, and that the use of multiple reactors is therefore not mandatory.

From the second reactor 2R, the melt is transported to a first polymerizer 1P, in which the conditions are arranged in accordance with the invention to provide a low viscosity, high end-cap product. Specifically, the temperature in the first polymerizer 1P is higher than in conventional processes, for example greater than 296° C. and preferably in the range of from 307 to 311° C., more preferably in the range of 307° C. to 309° C., for the production of polycarbonates from BPA and DPC.

In addition, the residence time in the first polymerizer is longer than in a conventional process. This increase in residence time can, in theory, be achieved through a decrease in throughput at constant reactor size, or by changing the size of the first polymerizer, although in practice only the first optional is realistically available. It is, however, difficult to define a precise numerical range for residence time, since the useable range depends in part on the maximum temperature available. For a given residence time and a given polymerizer volume, there is a well-defined temperature at which the desired reactions occur. For lower residence times the temperature should be higher, but temperature can not increase indefinitely because is limited by the materials of construction and the capabilities of the heating system. On the other hand, for higher residence time we could use lower temperatures, but this is not practical in a commercial facility because higher residence time means necessarily lower production rates. In the case of a 0.444 m$^3$ hold-up volume polymerizer operating with a throughput of 3,000 kg/hr, an appropriate residence time in the first polymerizer is on the order of 5 to 10 minutes, preferably 8.3 to 9.4 minutes. The hold-up volume is an indicator of residence time which is used with high viscosity polymerizers. Hold-up volume is defined as the sum of wet polymer volume and the volume of polymer retained in the blades. This is normally a fraction of the volume under the shaft center and is a function of blades geometry, viscosity and agitator tip speed. The practice is to keep this hold-up volume constant because it ensures an appropriate surface renewal and therefore an optimum phenol removal In the second polymerizer 2P shown in FIG. 1, a quencher is added to the melt to deactivate the catalyst. Quenchers useful for this purpose are known in the art and include butyl ester of p-toluene sulfonic acid. The quencher is suitably added at an amount of from 1 to 6 times the alkaline metal catalyst (on a molar basis). The process conditions in the second polymerizer 2P are consistent with conventional practice, for example of a temperature of 280 to 290° C. The product produced from the second polymerizer is a high end-cap, low viscosity product.

The pressure may be controlled in either or both of the first and second polymerizers if desired. Application of vacuum has the effect of removing free phenol and other volatile by-products. Vacuum is not used intentionally to provoke changes in end-cap level. However, it provides a quick correction for viscosity. Accepted manufacturing practice is to keep vacuum at the lowest values possible which provides sufficient room for viscosity control. The pressure in the first polymerizer is thus suitably maintained between $5.25 \times 10^{-3}$ Pa (0.7 torr) and $1.5 \times 10^{-2}$ Pa (2 torr) and preferably between $5.25 \times 10^{-3}$ Pa (0.7 torr) and $6.75 \times 10^{-3}$ Pa (0.9 torr).

Figure 3:
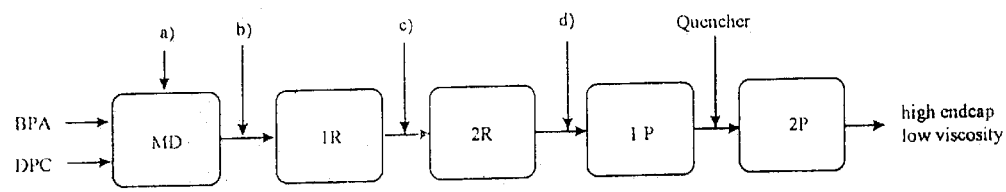
FIG. 3 shows an alternative linear processing scheme for manufacture of polycarbonates.

In the embodiment of FIG. 1, catalyst addition is shown only in the first stage of the process, when the melt is being formed. FIG. 3 shows an alternative embodiment of the invention in which an alkaline phosphorus catalyst such as $NaH_2PO_3$ is also added to the melt prior to each of the reactors 1R and 2R and the first polymerizer 2P (i.e., catalyst is added at points a, b, c and d). Operation in this configuration in which catalyst is continuously introduced at several points in the processing line results in a reduction in the amount of Fries branching in the final product. The catalyst is suitably added in an amount of 70 to 120 ppb, preferably about 100 ppb, based on the amount of dihydric phenol.

It will be appreciated that the specific number of a reactors and polymerizers shown in FIGS. 1–4 are not critical to the operation of the invention. Thus, for example, one may, if desired, include an additional polymerizer, prior to the addition of quencher in a linear processing scheme. This would allow the utilization of smaller equipment and or, for a given size of equipment, the extension of the residence time without reduction in the throughput.

In many industrial operations, it is desirable to be able to manufacture products with different specifications from the same line, depending on the products which are currently needed by customers. Thus, it is significant that the basic procedure for producing high end-cap, low viscosity polycarbonates as depicted in FIG. 1 and described above can be incorporated into more complex manufacturing schemes.

Figure 2:
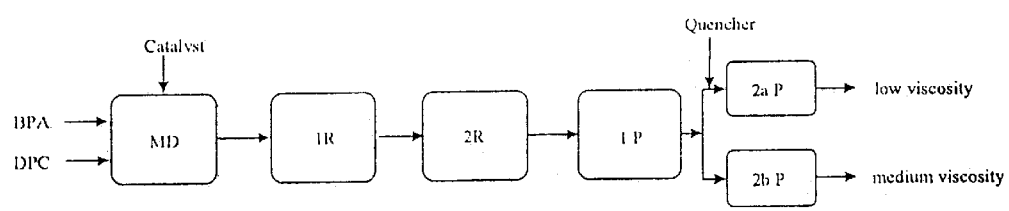
FIG. 2 shows a branched processing scheme for manufacture of polycarbonates.
Figure 4:
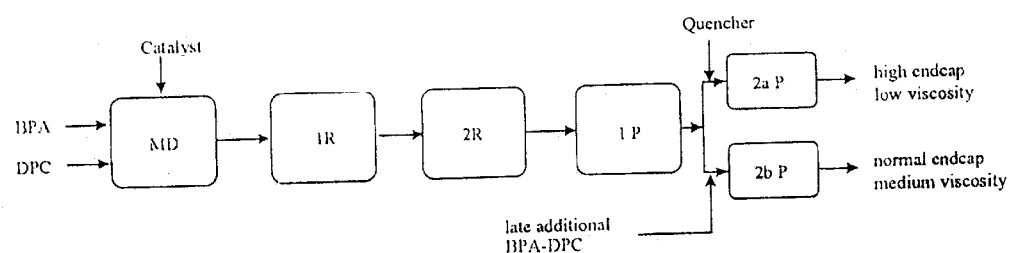
FIG. 4 shows an alternative branched processing scheme for manufacture of polycarbonates.

FIGS. 2 and 4 show various embodiments of invention in which this is the case.

In FIG. 2, a processing scheme for production of two products, a high end-cap, low viscosity product and a normal end-cap medium viscosity product is shown. The process operates the same as above through the first polymerizer. The product stream from the first polymerizer, however, is divided into two parts. One part is combined with quencher and passed to a second polymerizer 2aP to produce high end-cap low viscosity products as in FIG. 1. The other part is combined with additional BPA and/or DPC and processed in a second polymerizer 2bP without the addition of quencher. The DPC and/or BPA are suitably added in amounts of up to 5 wt %. The amount of DPC in this added composition can range from 0% to 100%. The second polymerizer 2bP is suitably operated under the following conditions:

temperature: 280 to 290° C.

pressure/vacuum: 0.2 to 1 mbar residence time: 15 to 30 minutes.

The process illustrated in FIG. 2 can also be performed with addition of catalyst at several points in the processing line. Such a processing scheme is illustrated in FIG. 4

In addition to the conditions used in the linear processing scheme, the most important parameter to be controlled in the second reaction line is the late addition of building blocks, i.e., BPA alone or in combination with DPC. A late addition of building blocks is favorable in order to obtain the desired end cap level and viscosity, because it reduces the end cap level and allows further polymerization of the existing mixture up to a medium viscosity range. Thus, addition of extra BPA results in an increase in the number of phenyl end-groups at the outlet of the first polymerizer 1P and provides some additional reactivity in 2Pb. Due the thermal instability of BPA, however, it may be more practical to use mixtures of BPA and DPC which are more thermally stable. A suitable mixture has the same composition used in the mixing drum (MD). Alternatively, oligomeric products produced in the first and second reactors 1R, 2R (having 60–65% hydroxyl groups) could be used for this purpose.

Similar results can be achieved using a "thermal upgrade" in the second polymerizer in lieu of later addition of building blocks. As illustrated in Example 5, raising the temperature in the second polymerizer from about 295 to about 305 can effectively modify the product to a medium viscosity polymer. This provides a useful method for producing high-end cap product with a range of possible viscosities adapted for various applications.

The invention will now be further described with reference to the following, non-limiting examples.

EXAMPLE 1

BPA and DPC were added into a polymerization layout as shown in FIG. 1. The reaction was conducted under the experimental conditions shown in Table 1. Main differences with respect to normal known operation art are that a higher DPC/BPA ratio was used (1.137 vs. 1.07); a higher temperature at the first polymerizer, (309° C. vs. 295° C.) was used as well as higher residence time (9.41 minutes vs 5.46 minutes). After 5 hours in order to ensure steady state conditions, polymer was extruded and pelletized. As can be seen in Table 1, the resulting pellets exhibited a high end cap (93–96%) and a low viscosity (melt flow rate (MFR) 10–12 g/10 min) fully validating the invention. In contrast, polycarbonate produced from the same line under normal conditions had an end-cap level of 80 to 85% and a melt flow rate of 10–12 g/10 min.

TABLE 1

Operating conditions and polymer analysis for Example 1

| | | Operating conditions | | | | Analysis Data | |
|---|---|---|---|---|---|---|---|
| Trial No. | Catalyst Ppb | DPC/BPA Molar ratio | Temper. 1P °C. | Vacuum 1st torr | Residence time 1P (min) | EC [%] | MFR [g/10 min] |
| X-162 | 115 | 1.137 | 309 | 0.8 | 9.41 | 93.8 | 10.5 |
| X-163 | | | | | | 95.7 | 10.8 |
| X-164 | | | | | | 96 | 11.2 |
| X-165 | | | | | | 95 | 11.1 |
| X-166 | | | | | | 94.7 | 10.4 |
| X-167 | | | | | | 94.3 | 11.2 |

EXAMPLE 2

A series of simulations using the ASPEN® Polymer Plus 9.3-2 polymerization model with a high end cap ratio starting material (2R) and different amounts of additional BPA (0.1–0.3%) to this material, result in a material which exhibited a progressive increase in molecular weight as shown by Table 2.

TABLE 2

Results of ASPEN simulation for late BPA addition concept

| | Starting material (2R) | | Finishing material | |
|---|---|---|---|---|
| Experiment | Mn (g mol$^{-1}$) | EC (%) | Mn (g mol$^{-1}$) | EC (%) |
| Baseline | 2421 | 62 | 9460 | 83 |
| High EC + 0.1% BPA | 2421 | 70 | 8415 | 91 |
| High EC + 0.2% BPA | 2421 | 70 | 9084 | 85 |
| High EC + 0.3% BPA | 2421 | 70 | 9490 | 78 |
| High EC + 0.4% BPA | 2421 | 70 | 9633 | 70 |

EXAMPLE 3

BPA and DPC were added into a polymerization layout like FIG. 1. The reaction was conducted at the conditions shown at Table 3. However, in order to illustrate this example, the typical amount of the conventional catalyst (NaOH) was replaced by a new alkaline-phosphorous- based catalyst (NaH$_2$PO$_3$+NaOH) added in the formulation tank. After 8 hours to ensure steady state conditions, the polymer was extruded and pelletized.

As can be seen in Table 3, using either catalyst the resulting pellets exhibited a high end cap ratio (93–96%) and a low viscosity (MFR at 250° C. of 10–12 g/10 min) fully validating the invention. However, a 30% reduction in the concentration of Fries product (930 ppm) was achieved using the alkaline phosphorus catalyst, as compared to the conventional catalyst (1350 ppm).

EXAMPLE 4

BPA and DPC were added into a polymerization layout as shown in FIG. 1. However in order to illustrate this example, quenching was performed downstream of the second polymerizer (2P) so that this can be used as an additional polymerizer. In this case 2P mimics the effect of an additional first polymerizer (1'P). The operating conditions were those shown at Table 4. After 8 hours running in order to ensure steady state conditions, polymer was extruded and pelletized. As can be seen in Table 4, resulting pellets exhibited a high end cap ratio (91–93%) and a low viscosity (MFR 9–11) fully validating the invention.

TABLE 3

Operating conditions and polymer analysis for Example 3

| Lot | Current catalyst (NaOH) ppb | New catalyst (NaH$_2$PO$_3$) ppb | DPC/BPA Molar ratio | Temp (1P) °C. | Vacuum (1P) Pascal | Resid. Time (1P) min | MFR d/g | EC % | Fries ppm |
|---|---|---|---|---|---|---|---|---|---|
| X-174 | 65 | 0 | 1.2 | 307.4 | 9.75 × 10$^{-3}$ | 8.06 | 11.1 | 94.5 | 1350 |
| X-175 | 10 | 100 | 1.114 | 307.5 | 1.125 × 10$^{-2}$ | 8.06 | 10.5 | 93.0 | 930 |

TABLE 4

Operating conditions and polymer analysis for Example. 4

| | | Operating conditions | | | | | | Analysis Data | |
|---|---|---|---|---|---|---|---|---|---|
| Trial No. | Catalyst (NaOH) Ppb | DPC/BPA Molar ratio | Temp. 1P °C. | Vac. 1st torr | Tem. 2P °C. | Vac. 2P torr | Resid. Time (2P) Min | EC [%] | MFR [g/10 min] |
| X-170-1 | 120 | 10097 | 2879 | 14 | 2858 | 4 | 152 | 91.8 | 10.20 |
| X-170-2 | | | | | | | | 91.6 | 10.00 |
| X-170-3 | | | | | | | | 91.4 | 9.24 |
| X-170-4 | | | | | | | | 91.2 | 8.83 |
| X-172-2 | | | | | | | | 92.0 | 10.6 |
| X-173-2 | | | | | | | | 93.3 | 10.7 |

EXAMPLE 5

As an alternative approach to late addition of monomers or oligomers to permit the simultaneous manufacture of high end-cap/low viscosity and normal end-cap/medium viscosity products, the process was carried out with a temperature increase in polymerizer 2Pb. To simulate a polymerization in a branched processing scheme of the type shown in FIG. 2, a batch of material of Lot X-175 (Example 3), was collected after the first polymerizer 1P. No quencher was added to the material before the second polymerizer, and no additional building blocks were added. Instead, the composition was processed in the second polymerizer 2P at a temperature that was raised as compared to standard operation. The alkaline phosphorous based catalyst was added in the formulation tank like in Example 3. After 8 hours running in order to ensure steady state conditions, the polymer was extruded and pelletized.

TABLE 5

Operating conditions an polymer analysis for Example No. 5

| Lot | Current catalyst (NaOH) ppb | New catalyst (NaH$_2$P O$_3$)ppb | DPC/BPA Molar ratio | Temp (1P) °C. | Vacuum (1P) Pascal | Resid. Time (1P) min | Temp. (2P) °C. | MFR d/g | EC % | Fries ppm |
|---|---|---|---|---|---|---|---|---|---|---|
| X-175 | 10 | 100 | 1.114 | 307.5 | $9.75 \times 10^{-3}$ | 8.06 | 294.7 | 10.5 | 93.0 | 930 |
| X-175 | 10 | 100 | 1.114 | 307.5 | $1.125 \times 10^{-2}$ | 8.06 | 304.7 | 28.0 | 93.7 | 1700 |

The results shown in Table 5 show the thermal upgrade of high end cap level starting material. As can be seen in Table 5, the resulting pellets exhibited a high end cap ratio (93–96%) and a medium viscosity (MFR at 300° C. of 27–29 g/10 min) fully validating the invention. Further it can be seen that the higher temperature in the second polymerizer 2P is effective to provide an increase in the viscosity of the product, while the opposite effect is achieved in the first polymerizer by a shift of the process conditions that includes a temperature increase. Thus, it can be seen that the present invention takes advantage of a complex and unobvious balancing of processes parameters to achieve the desired result.

What is claimed is:

1. A method for preparation of polycarbonates by the reaction of a diaryl carbonate and a dihydric phenol, comprising the steps of successively processing the diaryl carbonate and the dihydric phenol in a melt in one or more reaction stages and at least a first polymerization stage, characterized in that:

(a) the ratio of diaryl carbonate to dihydric phenol in the melt prior to the first reaction stage is 1.08 or greater; and (b) the temperature and residence time in the first polymerization stage are selected to provide a polycarbonate product having a melt flow rate at 250° C. of greater than 10 minutes and an end-cap level of at least 90%.

2. The method of claim 1, characterized in that the temperature in the first polymerization stage is 296° C. or greater.

3. The method of claim 2, characterized in that the temperature in the first polymerization stage is in the range of from 308° C. to 311° C.

4. The method of claim 3, characterized in that the residence time in the first polymerizer is at least 5.5 minutes.

5. The method of claim 4, characterized in that the first polymerizer is maintained at a pressure of from $5.25 \times 10^{-3}$ Pa to $1.5 \times 10^{-2}$ Pa.

6. The method of claim 2, characterized in that the residence time in the first polymerizer is at least 5.5 minutes.

7. The method of claim 2, characterized in that the first polymerizer is maintained at a pressure of from $5.25 \times 10^{-3}$ Pa to $1.5 \times 10^{-2}$ Pa.

8. The method of claim 1, characterized in that the residence time in the first polymerizer is at least 5.5 minutes.

9. The method of claim 1, characterized in that the first polymerizer is maintained of a pressure of from $5.25 \times 10^{-3}$ Pa to $1.5 \times 10^{-2}$ Pa.

10. The method of claim 1, characterized in that the first polymerization stage is carried out in a plurality of polymerizers.

11. The method of claim 1, characterized in that supplemental catalyst is added at various points during the processing of the melt.

12. The method of claim 1, characterized in that the product of the first polymerization stage is divided into a plurality of streams, including at least a first stream which is further processed to produce low viscosity, high end-cap product and a second stream which is further processed to produce a medium viscosity, medium end-cap product.

13. The method of claim 12, characterized in that additional diaryl carbonate and/or dihydric phenol are added to the second stream.

14. The method of claim 1, characterized in that the product of the first polymerization stage is divided into a plurality of streams, including at least a first stream which is further processed to produce low viscosity, high end-cap product and a second stream which is further processed to produce a medium viscosity product by processing in a second polymerizer at elevated temperature.

15. A polycarbonate produced in accordance with the method of claim 1.

* * * * *

UNITED STATES PATENT AND TRADEMARK OFFICE
CERTIFICATE OF CORRECTION

| | | |
|---|---|---|
| PATENT NO. | : 6,277,946 B1 | Page 1 of 1 |
| APPLICATION NO. | : 09/567826 | |
| DATED | : August 21, 2001 | |
| INVENTOR(S) | : Johannes Jacobus van Heijkant et al. | |

It is certified that error appears in the above-identified patent and that said Letters Patent is hereby corrected as shown below:

On the title page:
Abstract line 13: should be corrected as follows:
"having a melt flow rate at 250° C of greater than 10 g/min" should read as -- having a melt flow rate at 250° C of greater than 10 g/10 min--.

Column 10: claim 1 line 27: should be corrected as follows:
"(b) the temperature and residence time in the first polymerization stage are selected to provide a polycarbonate product having a melt flow rate at 250° C. of greater than 10 minutes" should read as -- (b) the temperature and residence time in the first polymerization stage are selected to provide a polycarbonate product having a melt flow rate at 250° C. of greater than 10 g/ 10 minutes--.

Signed and Sealed this

Twelfth Day of June, 2007

JON W. DUDAS
*Director of the United States Patent and Trademark Office*